May 24, 1927. 1,629,529
J. A. REIMER ET AL
DRAFT EVENER FOR HARROWS
Filed June 24, 1926
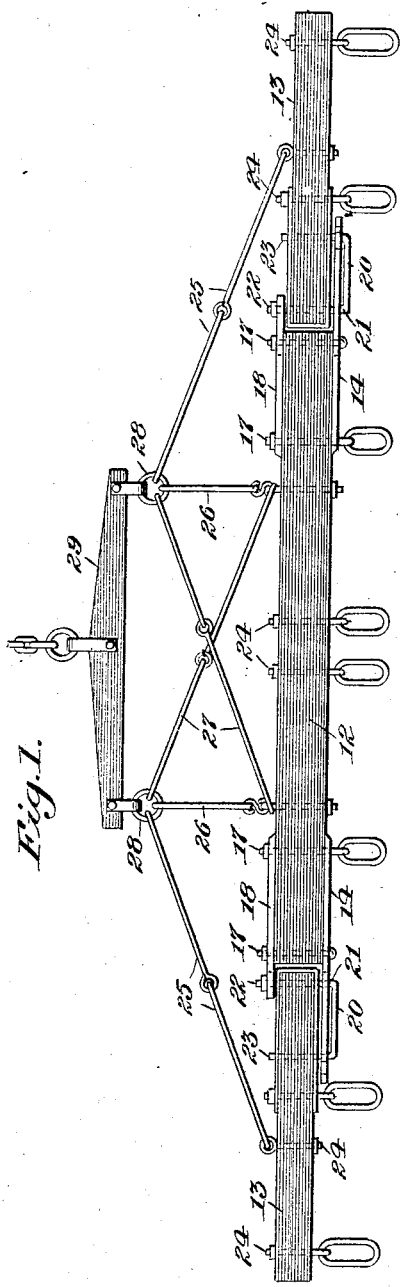
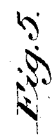
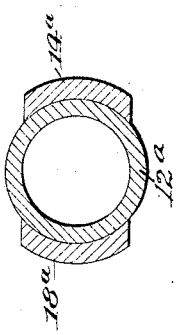
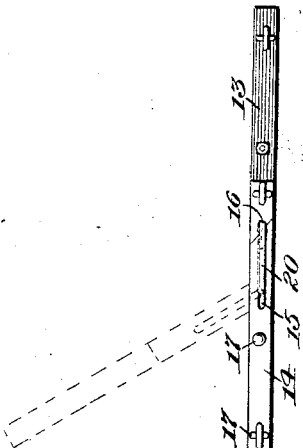
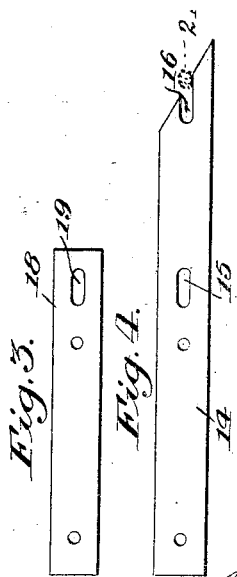
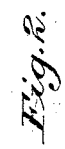
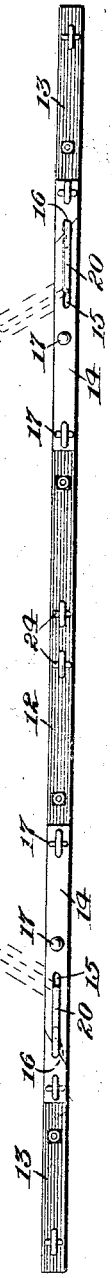

Patented May 24, 1927.

1,629,529

UNITED STATES PATENT OFFICE.

JORGEN ALFRED REIMER AND HANS CHRISTIAN HANSEN, OF ELK HORN, IOWA.

DRAFT EVENER FOR HARROWS.

Application filed June 24, 1926. Serial No. 118,353.

This invention relates to a draw-bar or draft evener for multiple section harrows, and has for its object to provide a simple and convenient construction whereby the outer sections of multiple harrows may be turned upward and inward so as to stand in approximately vertical, inclined positions when it is desired to lessen the stretch of the harrow for going through farm gates or other comparatively narrow passages. The present invention is an improvement on the draft evener or draw-bar of U. S. Patent No. 1,399,999, dated December 13, 1921, and provides an improved joint between the outer and inner sections at each end of the bar.

In the drawing Fig. 1 is a plan view illustrating the present invention, and Fig. 2 is an edge view of the same looking from the bottom of Fig. 1. Figs 3 and 4 are detail views of the side plates attached to the outer ends of the central section of the draw-bar, and Fig. 5 illustrates a modification of the invention.

Referring to the drawing, 12 denotes the double central section of a draw-bar of a four-section harrow, and 13 denotes the two outer sections thereof. To one side at each end of the bar 12 is bolted a plate 14 having a slot 15, said plate preferably having an outer inclined end provided with an open notch 16. Secured to the bar 12 by the same bolts 17 which hold the plates 14 in place is a plate 18 at each end of the section 12, these plates being each provided with a slot 19. The sections 13 are connected with the plates 14 and 18 by means of U-shaped bolts 20 each having an arm 21 of sufficient length to pass through the slots 15 and 19 of the plates 14 and 18, and the inner end of the outer section 13, the outer projecting threaded ends of said arms being provided with means, as nuts 22, to hold the U-shaped bolts 20 in place. The outer arms 23 of said U-shaped bolts pass through the sections 13 as clearly shown in Fig. 1.

The sections 12 and 13 are provided with the usual eye-bolts 24 for attachment to the jointed rods 25, 26, 27, which join the draft bar or draft evener with rings 28 on the tractor hitch bar 29.

When the harrow is in use the outer sections 13 will be moved inward so that the arms 21 of the U-bolts will be at the inner ends of the slots 15 and 19 in the bars 14 and 18, and the arms 21 of said U-bolts will be received in the notches 16 of the plates 14 and these outer sections are automatically held in their inner positions, as shown in Fig. 1, by the rods 25. When, however, it is desired to turn up the end sections of the harrow and draw bar for passage through farm gates and the like said end sections 13 are moved outward slightly to disengage the arms 21 of the U-bolts 20 from the notches 16 in the plates 14, (see dotted lines in Fig. 4), these sections at such time occupying the position denoted in Fig. 2. When the said sections have been thus drawn outward to disengage the arms 21 from the notches 16 of the plates 14 said end sections will be free to be turned up and over in inclined positions, as denoted in dotted lines in Fig. 2; and when in such positions the arms 21 of the U-bolts 20 will occupy the outer ends of the slots 15 and 19 in the plates 14 and 18, so that these turned-up sections will stand in the positions denoted by dotted lines in Fig. 2.

It will be understood from Fig. 4 that the lower sides of the plates 14 extend for some distance beyond the notches 16, owing to the fact that the outer ends of these plates are inclined, so that the extended ends of these plates below the notches 16 prevent the U-bolts from passing downward and doubling up the harrow.

From the foregoing it will be understood that the invention provides a draw bar or draft evener for multiple section harrows permitting the outer sections to be properly retained in working position, but allowing them to be turned up for the purpose of narrowing the harrow when desired. In these adjustments no tools are required, as the sections to be turned up are simply pulled outward manually to disengage the arms 21 of the U-bolts 20 from the notches 16 of the plates 14; and when the parts are to be returned to their working positions the sections 13 are simply dropped and the rods 25 automatically pull the said arms 21 back into the notches 16 when the harrow is started forward.

While in the present case the sections of draft evener or draw bar are represented in Figs. 1 and 2 as being formed of rectangular pieces of wood it will be understood that this is only the preferred embodiment of the invention, as the sections of the draw-bar might be of round metal tubes, in which case the plates $14^a$ and $18^a$ would be curved for properly fitting against the tubular central body sections 12ª, as will be understood from Fig. 5, or the draw-bar sections might be of square tubes, in which case the plates will be flat, as in Figs. 1 and 2.

Having thus described our invention we claim and desire to secure by Letters Patent:

1. The combination with two sections of a multiple section harrow draft evener or draw-bar, of a joint comprising two plates attached to opposite sides of one of said sections and near the end thereof, and extending beyond said end, said plates being each provided with a slot, one of said plates having an inclined outer end and being provided at said end with an open notch above its longest part, and a U-shaped bolt one arm of which passes through said section and said slots, and the other arm of which passes through the other section of said draw-bar; whereby said last-named section may be held in working position or may be drawn outward and may then be turned upward and inward when the multiple section harrow is to be contracted in width, as set forth.

2. A harrow draft evener or draw-bar for a multiple section harrow consisting of a central part or section and two end sections connected with said central part or section by joints each comprising two plates attached to opposite sides of said central section or part and extending outward beyond the end thereof, said plates being each provided with a slot, one of said plates having an inclined outer end and an open notch above its longest part, and a U-shaped bolt one arm of which passes through said central section near its end and also through the slots of said plates, and the other arm of which passes through an end section of said draw-bar; whereby said end sections may be adjusted to working positions or may be pulled outward and then turned upward and inward when the multiple section harrow is to be contracted in width, as set forth.

In testimony whereof we affix our signatures.

JORGEN ALFRED REIMER.
HANS CHRISTIAN HANSEN.